UNITED STATES PATENT OFFICE.

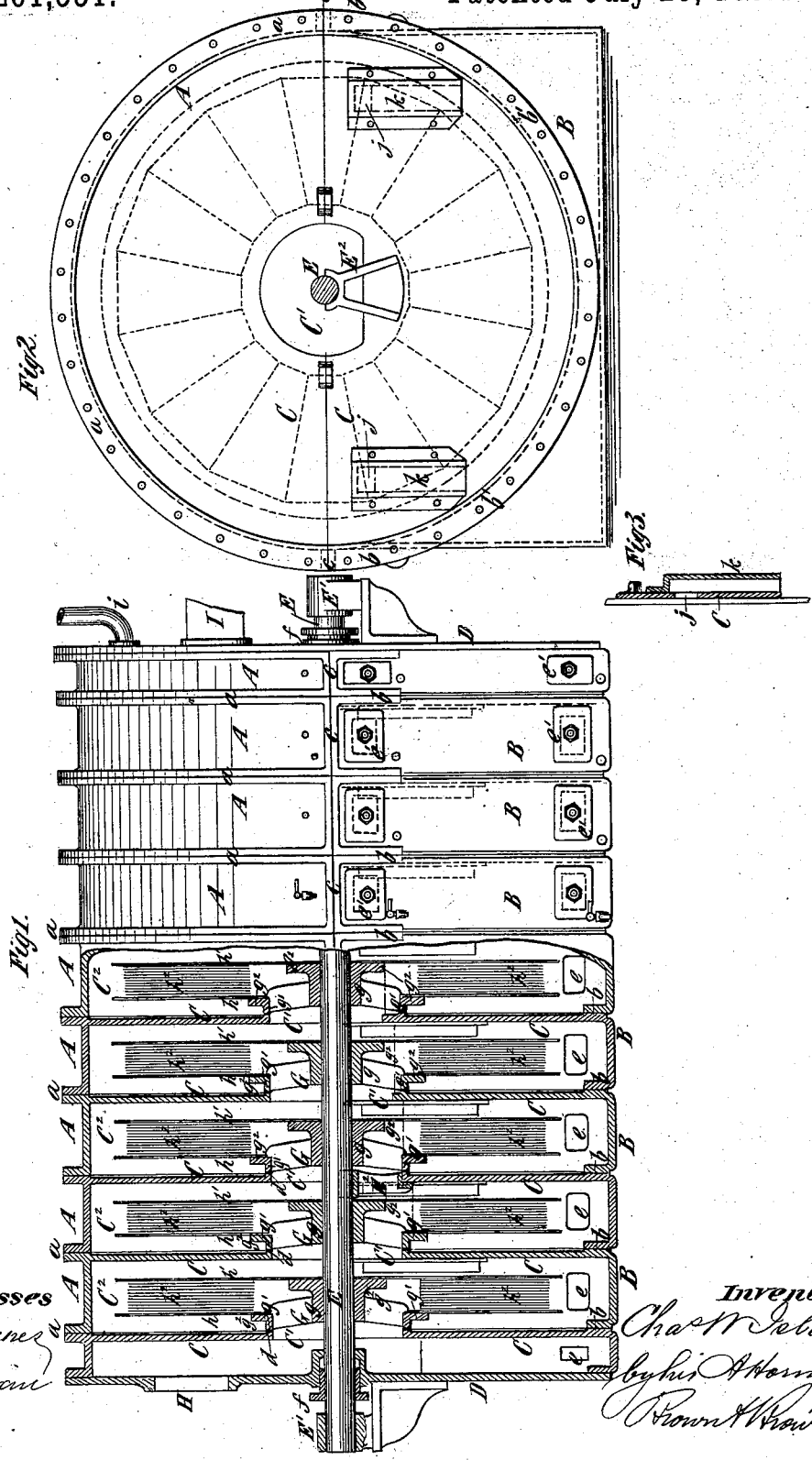

CHARLES W. ISBELL, OF NEW YORK, N. Y.

ROTARY GAS SCRUBBER OR WASHER.

SPECIFICATION forming part of Letters Patent No. 261,551, dated July 25, 1882.

Application filed October 29, 1881. (No model.)

*To all whom it may concern:*

Be it known that I, CHARLES W. ISBELL, of the city and county of New York, in the State of New York, have invented certain new and useful Improvements in Rotary Gas Scrubbers or Washers, of which the following is a specification.

This invention relates to a gas scrubber or washer of the kind illustrated and described in Letters Patent No. 206,736, granted August 6, 1878, to Thomas N. Kirkham, David Hulett, Samuel Chandler, Sr., and Samuel Chandler, Jr., and which comprises a case or vessel divided by transverse partitions each having an opening at the center, and a central shaft passing through the openings in said partitions, and carrying in the compartments formed by the partitions groups of annular sheet-metal plates, which are set at a very little distance apart in the groups. Water is introduced into the compartments between the partitions and the shaft is rotated to cause the plates carried by it to pass through the water, and gas introduced into the case or vessel at one end passes in a zigzag course through the central opening in the first partition, thence outward between the wet plates of the first group, thence inward through the opening in the second partition, thence outward between the wet plates of the second group, and so on to the delivery end of the case or vessel.

An important object of the present invention is to enable the machine to be more cheaply constructed, and also to enable any of the parts of the case or vessel to be readily removed to facilitate repairs or to enable the shaft and its groups of annular plates to be readily removed from said case or vessel.

To this end my invention consists in a case or vessel for a rotary gas-scrubber, divided longitudinally in a horizontal plane, and transverse partition-plates having central openings, and also divided in a horizontal plane, the upper portions of said partition-plates being formed integral with the upper portion of said case, and the lower portions of said plates being formed integral with the lower portion of said case.

The invention also consists in a horizontally-divided case or vessel for a rotary gas-scrubber, having its upper and lower portions each composed of separable flanged sections and horizontally-divided partition-plates, one-half of each of said plates being integral with one of said sections.

The invention also consists in the combination, with a case of the kind above described, of a central shaft and spiders of novel construction fixed thereon and carrying the groups of annular plates.

The invention also consists in the combination, in a rotary gas-scrubber, of a case or vessel having transverse partitions in which are central openings, a rotary shaft carrying groups of annular plates in the compartments between said partitions, and intermediate bearings bolted to said partition-plates and supporting the shaft between the ends of said case or vessel.

In machines of this kind the water which enters at one end is made to flow successively from one compartment to the next through openings, the lower edges of which vary in height, so as to maintain a depth of water in the several compartments, gradually decreasing from the end of the machine at which the water enters toward the other end; and another feature of my invention consists in the combination, with partitions having central openings for the passage of gas and other openings for the passage of water, of hoods which are open only at the bottom, attached to the partitions over the last-mentioned openings, and terminating far below the level of water, so that the lighter portions of the ammoniacal liquors, which are at the surface as they pass through the opening from one compartment, will be delivered far below the liquid-level in the next compartment and mixed with the heavier liquor, so that all portions of one group of annular plates will be wet with liquor of approximately uniform strength, and much better effects be produced.

In the accompanying drawings, Figure 1 represents a side elevation and partial longitudinal section of a machine embodying my invention. Fig. 2 represents a transverse section thereof, and Fig. 3 represents a section of a portion of one of the partition-plates and its attached hood.

Similar letters of reference designate corresponding parts in the several figures.

The case or vessel of the machine is here represented as having a semi-cylindric top or upper portion and a rectangular bottom or lower portion. The upper or top portion is composed of a number of semicircular sections, A, and the bottom or lower portion of a corresponding number of rectangular sections, B. The sections A are each provided with flanges $a$ at opposite edges, through which bolts may be inserted for securing them all together; and the several sections B have projecting flanges $b$, partly external and partly internal, through which bolts may be inserted for securing the several sections together.

The flanges $a$ of the upper sections, A, can be readily faced in a lathe, and upon the exterior of the rectangular face of each of the lower sections is formed a facing strip or piece, $b'$, which is a circular continuation of the flange $a$ of the opposite upper section.

The sections A and B are each provided at their ends with flanges $c$, through which bolts may be inserted for securing the upper and lower sections together.

The case or vessel is divided at suitable distances apart by transverse vertical partition-plates C, each of which is divided in a horizontal plane, the upper parts of the several plates being cast integral each with one of the sections A and the lower parts each with one of the sections B. In each partition-plate is a central opening, $C'$, formed partly in each half thereof, and around said opening, on one side of the partition-plate, is a facing piece or strip, $d$.

Each upper section, A, may be cast with its corresponding lower section, B, and the flanges $a$ $b$ and strip $d$ may be faced up in a lathe, after which the two sections are broken or cut apart in a horizontal plane.

The several upper sections, A, may be bolted together, side by side, and likewise the several lower sections B and the flanges $c$, and the meeting edges of the partition-plates C may then be faced in a planer.

The opposite ends of the case or vessel are closed by circular heads or plates D.

In the lower part of each lower section, B, and also in the upper part thereof and on both sides, are hand-holes $e$, closed by suitable hand-hole plates $e'$, and which afford convenient access to the several sections of the vessel or case between the partitions C.

E designates a shaft extending centrally through all the openings $C'$ in the partition-plates C and adapted to be rotated by any suitable gearing. The shaft is supported in outside bearings, $E'$, at each end of the case or vessel, and if the length thereof is such as to make it necessary, the shaft is also supported in open intermediate bearings, $E^2$, which are bolted to the partition-plates C, as seen in Fig. 2, and which are cast of such form as to offer the least obstruction to the flow of gas through the central openings, $C'$. The shaft E passes through stuffing-boxes $f$ in the heads D to prevent the escape of gas.

Secured upon the shaft E in each compartment $C^2$, between the partition-plates C, is a spider, G, which comprises a hub, $g$, keyed or otherwise secured to the shaft, a ring, $g'$, which is faced off and forms a faced joint with the facing $d$ on the partition-plates, and flanges $g^2$, projecting outwardly from said ring and hub.

To the flanges $g^2$ are secured two circular plates, $h$ $h'$, and between these plates are secured by bolts or otherwise a group, $h^2$, of annular sheet-metal plates, which are held at a distance of about one thirty-second ($\frac{1}{32}$) of an inch apart by bosses or teats struck up from them or in any suitable manner.

Turning now to the means for supplying and distributing water, $i$ designates a small inlet-pipe, through which there is a small continuous supply, and at or near the bottom of each section B there is an outlet-pipe through which the water escapes.

The depth of water in the several compartments $C^2$ is gradually decreasing from the inlet end toward the other end of the machine, and the water-level in the several compartments is indicated by an irregular dotted line extending longitudinally of the machine in Fig. 1.

The proper water-level is maintained by forming in each partition-plate C an opening, $j$, upon one or upon each side of the shaft E, as seen in Figs. 2 and 3, and the lower edges of the openings are at different levels in the several partitions, they being the highest at the end where water is admitted and lowest at the opposite end.

The shaft E and its several groups of plates $h^2$ are rotated, and as the plates are immersed in water nearly half their diameter they are kept wet all over their surface by the rotation of said shaft.

The gas enters at the end opposite to that on which the water enters by a gas-inlet pipe, H, and passes in a zigzag line first through the opening $C'$ in the first partition, thence outward between the several wet plates of the first group, thence through the central opening, $C'$, in the second partition, and outward between the wet plates of the second group, thence inward through the central opening, $C'$, in the third partition, and so on through the entire length of the machine, from which it escapes through an outlet-pipe, I.

The process by which the gas is washed or scrubbed is well known, the ammonia first being taken up by the water, forming ammoniacal liquor, and the sulphur impurities being then taken up by the ammoniacal liquor.

The water or liquor taking up fresh ammonia in each compartment becomes heavier, and in order that the lighter liquor overflowing from one compartment may be thoroughly mixed with that in the next one, so as to wet the rotary plates in one compartment with a uniform quality or strength of liquor over their whole surface, I cover each opening, $j$, in the partition-plates C by a hood, $k$, which is shown clearly in Figs. 2 and 3. This hood terminates below the level of liquid in the compartment wherein it is situated, and the lighter ammoniacal liquor on passing through the openings is caused to pass down the hoods $k$ to the lower end thereof, and cannot rise to the surface in the compartment which it is entering without passing through the heavier liquor therein and becoming mixed therewith.

It will be observed that all the joints in my machine are faced joints, which may be readily broken at any time, when necessary, and are also cheaply made.

If it is desired at any time to remove one of the sections A, the bolts which secure it to its adjacent section and the bolts through its end flanges, $c$, should be taken out, whereupon it may be lifted out of place, together with the half of the partition-plate cast therewith. By taking out all the bolts from the flanges $c$ the whole upper or top portion of the case or vessel, together with the upper halves of all the partition-plates, may be lifted out and removed, and the shaft and all its groups of plates exposed to view or lifted bodily and intact out of the case or vessel.

The hoods which contain or cover the water-openings through the partition-plates C effect a much more uniform distribution of the ammoniacal liquors, and thus render the machine more effective in its operation.

What I claim as my invention, and desire to secure by Letters Patent, is—

1. In a rotary gas-scrubber, a case or vessel divided longitudinally in a horizontal plane, and transverse partition-plates having central openings and also divided in a horizontal plane, the upper portions of the said partition-plates being formed integral with the upper portion of the case and the lower portions of said plates integral with the lower portion of the case, substantially as specified.

2. In a rotary gas-scrubber, the horizontally-divided case or vessel, the upper and lower portions of which are each composed of separable flanged sections, and the horizontally-divided partition-plates, one-half of each of said partition-plates being integral with one of said separable sections, substantially as specified.

3. The combination, with the case or vessel having transverse partitions C, each with a central opening, $C'$, forming compartments $C^2$, of the rotary shaft E, a single spider, G, secured to said shaft in each compartment, comprising the hub $g$, the ring $g'$, and flanges $g^2$, plates $h$ $h'$, secured to said flanges, and annular plates between the plates $h$ $h'$, all substantially as specified.

4. In a gas-scrubber, the combination of a case or vessel having transverse partitions in which are central openings, a rotary shaft carrying groups of annular plates in the compartments between said partitions, and intermediate bearings bolted to said partition-plates and supporting the shaft between the ends of the case or vessel, substantially as specified.

5. In a rotary gas-scrubber, the combination of a case or vessel with transverse partitions, dividing the vessel into separate compartments, and which have central openings and other openings independent of said central openings for the passage of water or liquid, substantially as specified.

6. In a rotary gas-scrubber, the combination of the case or vessel, the partition-plates C, having central openings, $C'$, for gas and side openings, $j$, for water, and the hoods $k$, covering the openings $j$, substantially as specified.

CHAS. W. ISBELL.

Witnesses:
FREDK. HAYNES,
ED. MORAN.